United States Patent [19]
Fukushima et al.

[11] Patent Number: 5,359,584
[45] Date of Patent: Oct. 25, 1994

[54] DATA RECORDING/REPRODUCING METHOD AND APPARATUS HAVING MEANS FOR RELIABLE DETECTION OF UNRECORDED SECTORS

[75] Inventors: Yoshihisa Fukushima, Osaka; Isao Satoh, Neyagawa; Yuzuru Kuroki, Sapporo; Tamotsu Matsuo, Osaka, all of Japan

[73] Assignee: Matsushita Electric Industrial Co., Ltd., Osaka, Japan

[21] Appl. No.: 451,747

[22] Filed: Dec. 18, 1989

[30] Foreign Application Priority Data

Dec. 16, 1988 [JP] Japan ................. 63-319033

[51] Int. Cl.$^5$ ................................. G11B 5/09
[52] U.S. Cl. ........................... 369/58; 369/48
[58] Field of Search ............ 369/275.3, 58, 59, 111, 369/32, 56, 44.26, 54; 360/72.1, 72.2, 48, 49, 77.08

[56] References Cited

U.S. PATENT DOCUMENTS

| | | | |
|---|---|---|---|
| 4,630,140 | 12/1986 | Sugimura et al. | 360/49 |
| 4,734,901 | 3/1988 | Murakami | 369/59 |
| 4,774,700 | 9/1988 | Satoh et al. | 369/58 |
| 4,825,310 | 4/1989 | Song | 360/77.08 |
| 4,862,443 | 8/1989 | Tsuji et al. | 369/59 |

Primary Examiner—Aristotelis Psitos
Assistant Examiner—P. W. Huber
Attorney, Agent, or Firm—Wenderoth, Lind & Ponack

[57] ABSTRACT

In recording data on a disk-shaped information recording medium having formed thereon a plurality of concentric or spiral tracks each being divided into a plurality of sectors each having an ID field and a data field, a data mark is selected from a plurality of distinct data marks according to an address of a target sector such that the selected data mark is different from a data mark recorded in an adjacent sector which is contained in an adjacent track. The selected data mark is recorded at the start position of the data field of the target sector. In reproducing the recorded data, a data mark is selected from the plurality of distinct data marks according to an address of a target sector, and is compared with a data mark reproduced from the target sector to detect whether the reproduced data mark coincides with the selected data mark. Sector data in the target sector is reproduced only when the reproduced data mark coincides with the selected data mark.

4 Claims, 4 Drawing Sheets

DATA RECORDING/REPRODUCING METHOD AND APPARATUS HAVING MEANS FOR RELIABLE DETECTION OF UNRECORDED SECTORS

BACKGROUND OF THE INVENTION

1. Field of the Invention

The present invention relates to a data recording/reproducing apparatus which performs data recording/reproducing operations on a sector by sector basis using a disk-shaped information recording medium.

2. Description of the Prior Art

On the optical disk, optically detectable guide tracks are provided concentrically or spirally, and data are recorded by irradiating a laser beam, which is contracted to a diameter of less than 1 μm, onto the guide tracks. Also, each track formed on the disk is divided into plural sectors. Data are recorded on a sector by sector basis.

Figure 4:
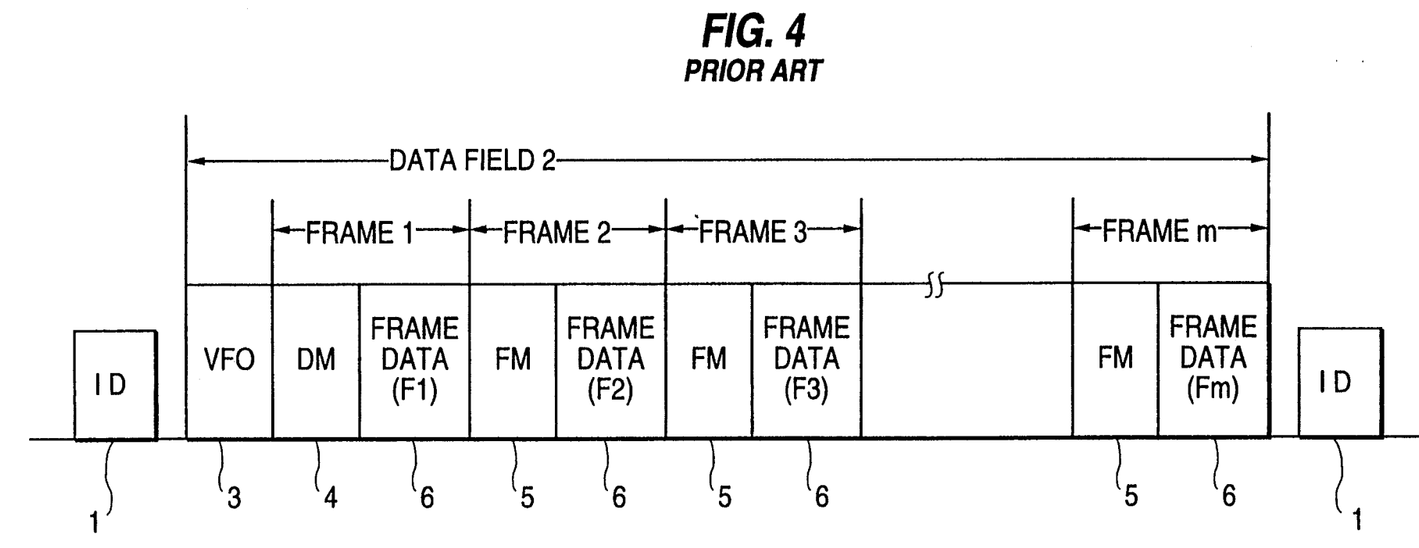
FIG. 4 is a schematic diagram of a sector format used for a conventional data recording/reproducing apparatus.

An explanation of the sector format follows with reference to the drawings. FIG. 4 is a schematic diagram of a sector format used for a conventional data recording/reproducing apparatus. In FIG. 4, incorporated at each sector are an ID (identification) field 1 having recorded therein address information which includes a track address and a sector address, and a data field 2 having sector data recorded therein. An initial region of the data field 2 has a VFO Field 3 formed therein in which a cyclic signal is recorded for synchronization of a PLL (Phase Locked Loop), and a subsequent region of the data field 2 is divided into plural frames (in the FIG. 4, there are m frames numbering from Frame 1 to Frame m). The plural frames of the data sector include m sets of frame data (from F1 to Fm), respectively. Further, in an initial region of Frame 1 just prior to the first frame data F1, a data mark DM is added which is a synchronous signal for identifying the beginning of the frame data. Thus, recorded in the Frame 1 is a data mark field 4 and a frame data field 6. In an initial region of the subsequent Frames 2 to m just prior to the frame data Fn (n=2 to m), a frame mark FM is added which is a resynchronization signal for identifying the beginning of a frame. Thus, recorded in each Frame n (n=2 to m) is a frame mark field 5 and a frame data field 6.

The reasons for recording the sector data as a plurality distinct frame data is to protect against uncorrectable data errors resulting from a bit slip phenomenon. Namely, burst dropout may occur during signal reproduction due to defects, dust, flaws, etc., contained, for example, in the substrate, recording film, or protective layer composing an optical disk. When a burst dropout occurs, data is generated having a slip due to an abnormal increase or decrease in the number of read clocks, and the bit slip phenomena, in which all the data thereafter contains errors, may result. However, if the sector data are divided and recorded in plural distinct frames, even if such a phenomena occurs in one frame, the data error will be limited to the one frame and a shift of the read clock is compensated by locating the next frame mark, thus making it possible to carry out normal data reproduction in the next and subsequent frames.

When reproducing data from a target sector in an information recording medium having the above-described sector format, the data recording and reproducing apparatus carries out normal data reproduction by detecting the data mark from a reproduced signal and then triggering the demodulation. Also, when the data mark cannot be detected due to a defect, the data recording/reproducing apparatus will instead trigger the demodulation upon detecting the frame mark recorded in the 2nd frame. When scanning an unrecorded sector in which data have not been recorded at all in the data field, reproduction is not triggered because neither the data frame nor a frame mark will be detected, and the data recording/reproducing apparatus confirms that the target sector is an unrecorded sector by, for example, detecting an envelop signal which shows the existence or non-existence of the reproduced signal.

In order to implement high density recording, guide tracks having a narrow track pitch are formed on the recording medium disk. Stress may occur in the formation of the laser beam due to dislocation of a focusing control and tilting of the disk relative to the optical head.

The intensity of a laser beam on an optical disk generally exhibits a Gaussian distribution. Therefore, the intensity of a crosstalk signal, which is a reproduced signal from an adjacent track, increases as the track pitch is narrowed and the adjacent track is irradiated due to dislocation of the laser beam. In the case where an unrecorded target sector has adjacent thereto a recorded track, the data recording/reproducing apparatus can erroneously trigger demodulation upon identifying a data mark contained in a crosstalk signal from the adjacent track and thus behave as if the data recorded in the adjacent track is instead recorded in the target sector. If such a condition occurs, the reliability of data reproduced from the target sector is substantially lowered.

SUMMARY OF THE INVENTION

An object of the present invention is to provide a data recording/reproducing method and a data recording/reproducing apparatus for reliably detecting an unrecorded sector, even if the unrecorded sector is adjacent to a recorded sector of an adjacent track, and even if a crosstalk signal from the adjacent track is detected.

In order to achieve the above-mentioned object, a data recording/reproducing method of the present invention includes forming on a disk-shaped information recording medium a plurality of concentric or spiral tracks each divided into a plurality of sectors, each sector having an ID field in which address information is recorded and a data field in which sector data is recording subsequently to a data mark, the data mark being a synchronization signal at the start position of the data field identifying the start of the data field, the method being characterized in that the data mark in each sector of each track has a different pattern than that of the data mark in each sector of an adjacent track.

Also, a data recording/reproducing apparatus of the present invention includes a data mark generation means for generating a plurality of data marks having different patterns of synchronization signals; a data mark selecting means for selecting one of the plurality of data marks generated from the data mark generation means based on an address of a sector in which a sector data is to be recorded; a data mark holding means for holding the plurality of data marks used for data recording; and a data mark checking means for checking for a coincidence between a reproduced data mark and a standard data mark selected from the data marks held by the data mark holding means based on an address of a sector from which the reproduced data mark is obtained.

With the above-mentioned configuration of the present invention, during a data recording mode, the data mark selecting means selects a data mark to be added to a sector, from among the plurality of data marks generated by the data mark generation means, based on the address of the sector such that the selected data mark has a different pattern than that added to a sector of an adjacent track.

During a data reproducing mode, the data mark checking means selected a standard data mark, which should be contained in data reproduced from a sector, from among the data marks held by the data mark holding means based on an address reproduced from the sector, and checks whether a data mark reproduced from the sector coincides with the selected standard data mark. If a data mark in a sector of an adjacent track is reproduced due to crosstalk, the data does not coincide with the selected standard data mark. Thus, the apparatus does not erroneously start the data reproducing operation.

The present invention prevents erroneous data reproduction from an unrecorded sector which is adjacent to a data recorded track, and thus improves the reliability of the reproduced data.

DESCRIPTION OF THE PREFERRED EMBODIMENTS

Different data marks and different frame marks between adjacent tracks are used for the purpose of identifying whether a data mark or a frame mark contained in a reproduced signal is detected from a target sector or from the crosstalk of an adjacent track.

The simplest method for achieving the above is to carry out data recording by classifying all of the tracks into 2 groups on the basis of whether the track address of a given track is an odd number or an even number. Different data mark and frame mark patterns are recorded for sectors having an odd number track address than sectors having an even number track address. Erroneous data reproduction triggered by a crosstalk signal from an adjacent track is prevented by carrying out the data reproduction only when the data mark and frame mark patterns detected in the reproduced signal coincide with patterns associated with the track address of the target sector.

Figure 1A:
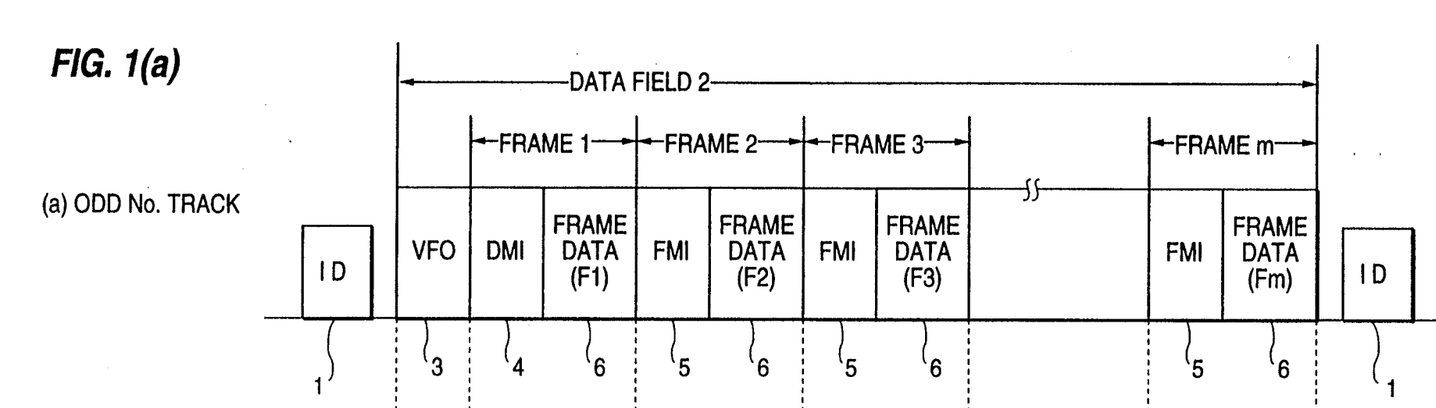
FIG. 1 is a schematic diagram of a sector format to be used for a data recording/reproducing apparatus of the present invention.
Figure 1B:
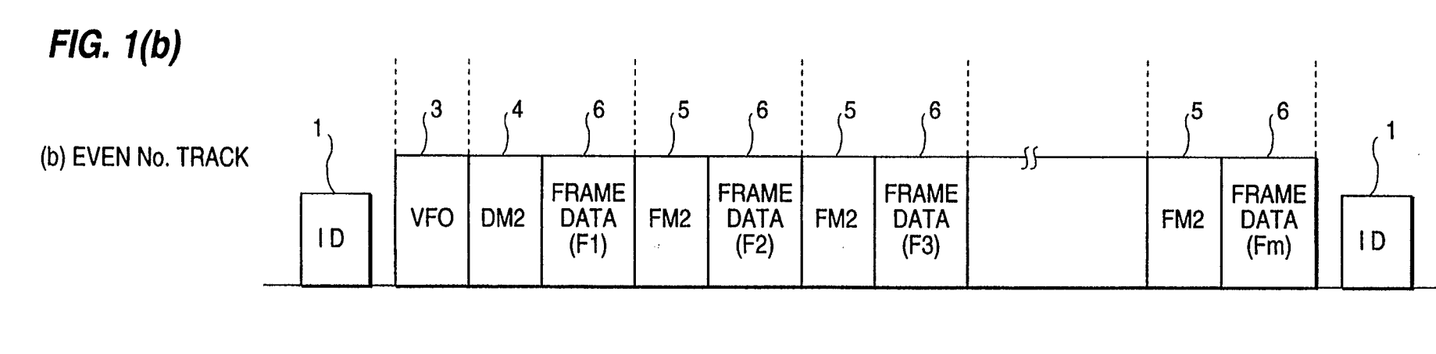

FIG. 1 is a schematic diagram of a sector format for use in the data recording/reproducing apparatus of the present invention. FIG. 1(a) is a schematic drawing of a sector format recorded on an odd number track, and FIG. 1(b) is a schematic drawing of a sector format recorded on an even number track.

As shown in FIG. 1(a), a data mark DM1, which is a synchronization signal for identifying the start of the sector data, is recorded in a data mark field 4, and a frame mark FM1, which is a resynchronization signal for identifying the start of a new frame, is recorded in a frame mark field 5. Meanwhile, as shown in FIG. 1(b), a data mark DM2, which has a different pattern than the data mark DM1, is recorded in data mark field 4, and a frame mark FM2, which has a different pattern than the frame mark FM1, is recorded in frame mark field 5.

In selecting the patterns of the data marks and frame marks, it is necessary to minimize redundancies by using a short pattern which does not appear in the recorded data. For example, in an optical disc drive and in a magnetic disc drive, which perform data modulation using 2-7RLLC (Run Length Limited Code), it is common that the frame mark is composed of a 16-bit modulated code (a first pattern corresponding to 1 data byte) such as

"00100000 00100100"

which does not appear in the demodulated data. Therefore, for instance, the following pattern,

"00100000 00000100"

which is obtained by removing a "1" from the first pattern can be considered as the second frame mark. In the 2-7RLLC, since there is no case in which more than seven consecutive "0" bits appear in a modulated code, this second pattern does not appear in the recorded data. Further, since the length of the pattern does not change, there is no case in which the redundancies will increase.

Also, as for the data marks, which are synchronization signals for identifying the start of the sector data, the following patterns, for example, do not appear in the 2-7RLLC, "00000001 00000010 00000010 00000100 00000100"
"00100000 00100100 10001000 01000000 01001000"

Since each of these data marks is recorded at the start of the entire sector data and is used for generating an alternative signal of the frame mark in the case where the frame mark is not detected due to some defect, the data mark must have a high reliability. Therefore, the data mark is made to have a high reliability by using a longer pattern than that of the frame mark.

Figure 2:
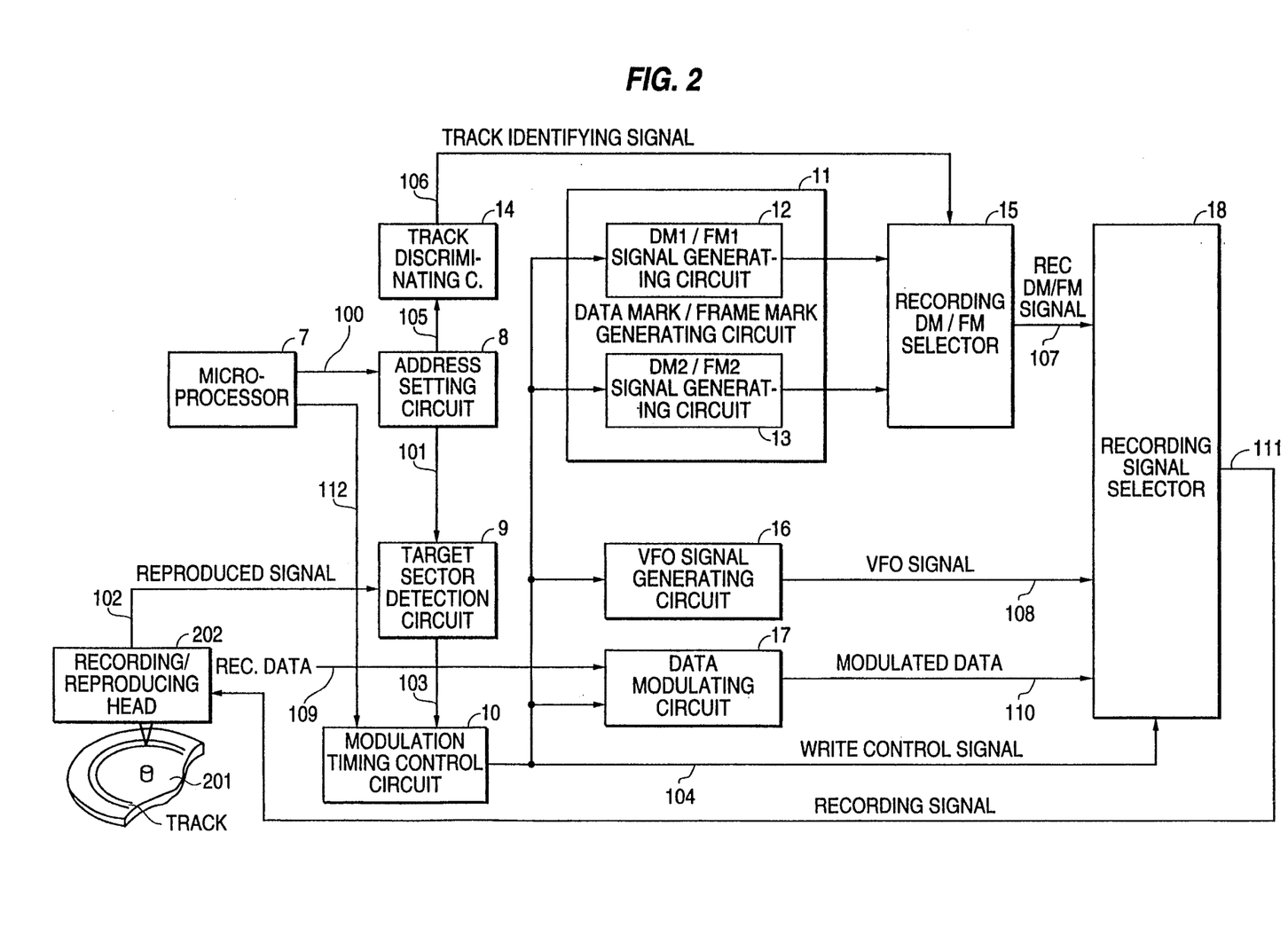
FIG. 2 is a block diagram of a data modulating field in a data recording/reproducing apparatus of the present invention.

FIG. 2 is a block diagram for explaining a data modulation portion of the data recording/reproducing apparatus of the present invention, in which the data modulation portion carries out data recording using the sector format as described in FIG. 1. In FIG. 2, reference numeral 7 denotes a microprocessor for controlling the entire data modulation operation in accordance with the control procedure incorporated therein; reference numeral 8 denotes an address setting circuit for holding an address of a target sector in which data are to be recorded; reference numeral 9 denotes a target sector detection circuit for detecting the coincidence between the target sector address 101 held in the address setting circuit 8 and a reproduced sector address contained in a reproduced signal 102 read from a disk 201; reference numeral 10 denotes a modulation timing control circuit for generating a write control signal 104 corresponding to a sector format shown in FIG. 1 in accordance with a target sector detecting signal 103 output by the target sector detection circuit 9; reference numeral 11 denotes a data mark/frame mark generating circuit composed of a DM1/FM1 signal generating circuit 12 and a DM2/FM2 signal generating circuit 13 which generate two kinds of data marks and frame marks; reference numeral 14 denotes a track discriminating circuit for generating a track identifying signal 106 after discriminating between an odd number tack and an even number track by reading the track address 105 from the address setting circuit 8; reference numeral 15 denotes a recording DM/FM signal selector for selecting, as a recording DM/FM signal 107 used for data recording, one of the two kinds of signals output by the data mark/frame mark generating circuit 11 based on the track identifying signal 106; reference numeral 16 denotes a VFO signal generating circuit which generates a VFO signal 108 for synchronizing a PLL; reference numeral 17 denotes a data modulating circuit which adds an error correction code to a user data to produce a recording data 109 and modulates the recording data 109 to produce a modulated data 110; reference numeral 18 denotes a recording signal selector for selecting, as a recording signal 111 to be recorded in the target sector, one of the recording DM/FM signal 107, the VFO signal 108, and the modulated data 110 based on the write control signal 104 output according to the sector format.

The data recording operation of the data modulation portion configured as above will now be explained. First, the microprocessor 7 sets in the address setting circuit 8 address information 10 which contains the track address and sector address of a target sector, and then sends a write-enable signal 112 to the modulation timing control circuit 10. The track discriminating circuit 14 discriminates whether the target sector is located on an odd number track or an even number track by the reading track address 105 from the address information 100 set at the address setting circuit 8, and then outputs a corresponding track identifying signal 106. Following this, the target sector detecting circuit 9 detects a coincidence between the target sector address 101 read from the address setting circuit 8 and the reproduced address signal contained in a reproduced signal 102 from ID field 1, and outputs a target sector detecting signal 103 upon detection of the target sector. When the target sector detecting signal 103 is output in a state at which the write enable signal 112 is output from the microprocessor 7, the modulation timing control circuit 10 is triggered. The modulation timing control circuit 10 outputs the write control signal 104, in accordance with the sector format shown in FIG. 1, to the VFR signal generating circuit 16, the data mark/frame mark generating circuit 11, the data modulating circuit 17 and recording signal selector 18. That is, referring to the sector format shown in FIG. 1, when the recording/reproducing head 202 is in the VFO field 3 of the data field 2, the VFO signal generating circuit 16 is triggered and generates the VFO signal 108. The recording signal selector 18 selects and outputs the VFO signal 108 as the recording signal 111 to the recording/reproducing head. When the recording/reproducing head is positioned at the data mark field 4 or frame mark field 5 and when two kinds of data marks or frame marks are generated following the triggering of the DM/FM signal generating circuit 11, the recording DM/FM signal selector 15 selects and outputs, as the recording DM/FM signal 107, one of the two kinds of data marks or frame marks which corresponds to the track address of the target sector as indicated by the track identifying signal 106. The recording signal selector 18 selects the recording DM/FM signal 107 based on the write control signal 104 and outputs the same as the recording signal 111. Furthermore, when the recording/reproducing head is positioned at a frame data field 6, the data modulating circuit 17 is triggered by the write control signal 104 to generate modulated data 110 by modulating the recording data 109, and the recording signal selector 18 selects the modulated data 110 based on write control signal 104 and outputs the same as the recording signal 111.

As described above, data are recorded in accordance with the sector format shown in FIG. 1. In the data recording operation, a sector of an odd number track address and a sector of an even number track address have respectively different data marks and frame marks recorded therein.

Figure 3:
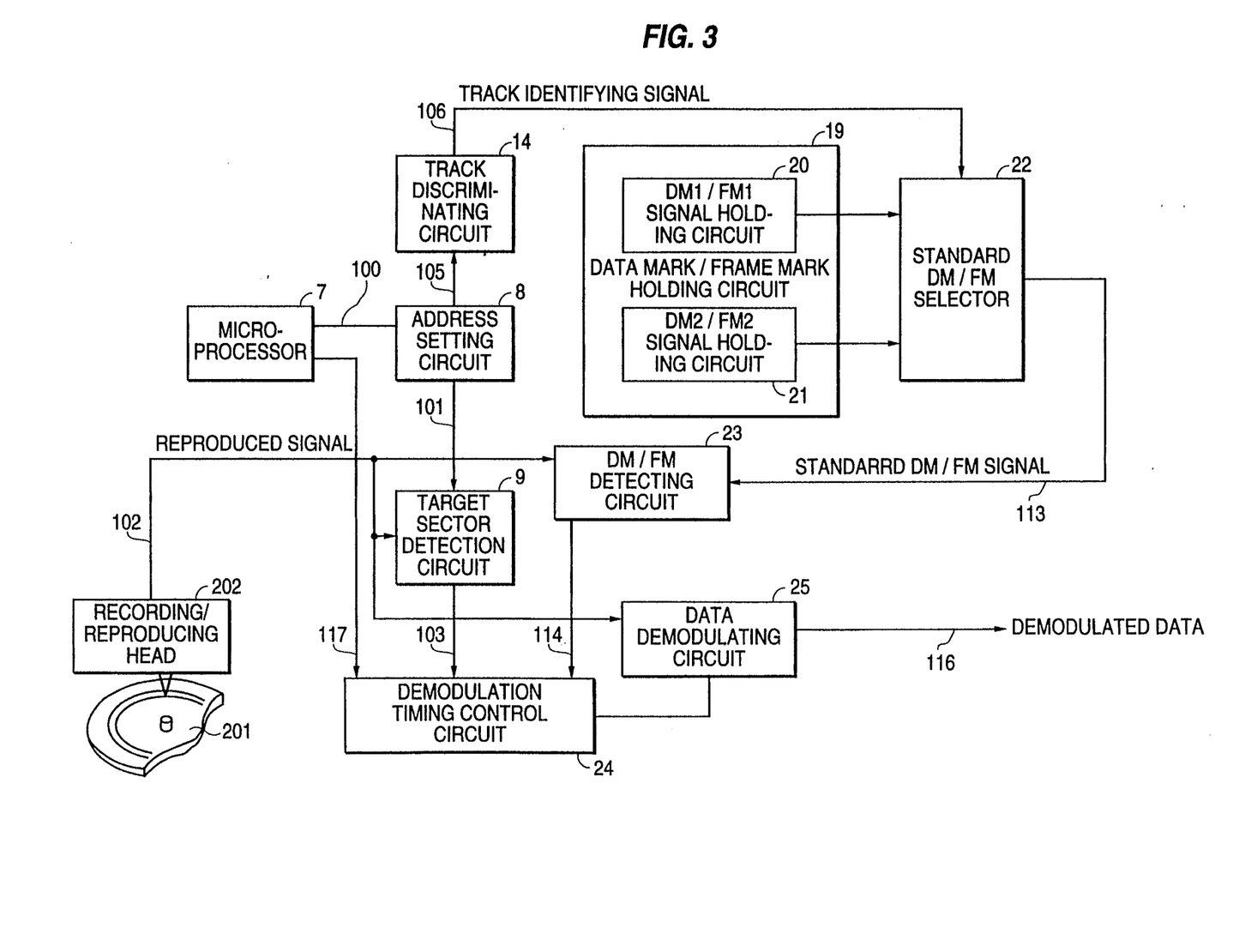
FIG. 3 is a block diagram of a data demodulation field in a data recording/reproducing apparatus of the present invention.

FIG. 3 is a block diagram of a data demodulation portion of a data recording/reproducing apparatus of the present invention. The data demodulation portion carries out the reproduction of data recorded on a recording medium in the sector format shown in FIG. 1. In FIG. 3, reference numeral 7 denotes a microprocessor which controls the entire data demodulation portion in accordance with a control procedure incorporated therein; reference numeral 19 denotes a data mark/frame mark holding circuit composed of a DM1/FM1 signal holding circuit 20 and a DM2/FM2 signal holding circuit 21 for respectively holding two kinds of data marks and two kinds of frame marks which are to be detected in the target sectors of the odd number and even number tracks; reference numeral 14 denotes a track discriminating circuit for outputting a track identifying signal 106 by discriminating whether the target sector is of an odd number track or an even number track by reading a track address 105 from an address setting circuit 8; reference numeral 22 denotes a standard DM/FM selector for selecting and outputting, as a standard DM/FM signal 113 to be detected in the data reproducing operation, one of the two kinds of signals output from the data mark/frame mark holding circuit 19 based on the track identifying signal 106; reference numeral 23 denotes a DM/FM detecting circuit for outputting a frame pulse 114 upon detecting a signal which corresponds to the standard DM/FM signal 113 from the reproduced signal 102; reference numeral 8 denotes an address setting circuit for holding the address of the target sector from which data is to be reproduced; reference numeral 9 denotes a target sector detecting circuit for detecting a coincidence between the target sector address 101 and the address signal contained in the reproduced signal 102; reference numeral 24 denotes a demodulated timing control circuit for outputting a read control signal 115 based on both the frame pulse 114 output by the DM/FM detection circuit 23 and a target sector detection signal 103 output by the target sector detection circuit 9; reference numeral 25 denotes a data demodulating circuit which discriminates and demodulates from the reproduced signal 102 the frame data recorded in the frame data field 6 based on the read control signal 115, and then generates the demodulated data 116.

An explanation now follows of the data reproduction operation of the data demodulation portion composed as above. First, the microprocessor 7 sets in the address setting circuit 8 the address information 100 which contains a track address and a sector address of the target sector, and at the same time outputs a read-enable signal 117 to the demodulation timing control circuit 24. The track discriminating circuit 14 reads the track address 105 from the address information 100 set in the address setting circuit 8 and outputs a track identifying signal 106 by discriminating whether the target sector is located on an odd number track or an even number track. When the track identifying signal 106 is output, the standard DM/FM signal selector 22 selects and outputs, as the standard DM/FM signal 113 to be detected in the data reproducing operation, one of the two kinds of signals output by the data mark/frame mark holding circuit 19. Also, the target sector detection circuit 9 detects an address signal contained in the reproduced signal 102 from the ID field 1 and detects a coincidence of the detected address and the target sector address 101 read out from address setting circuit 8. When the target sector is detected, the target sector detection signal 103 is output. In a state in which the read-enable signal 117 is output from the microprocessor 7, the demodulation timing control circuit 24 is triggered following the output of the target sector detection signal 103. When the DM/FM detection circuit 23 outputs the frame pulse 114 upon detecting a data mark or a frame mark (in the data mark field 4 or frame mark field 5 of the reproduced signal 102) which coincides with the standard DM/FM signal 113, the demodulation timing control circuit 24 outputs the read control signal 115. The read control signal 115 is output during a time in which the recording/reproducing head passes through the frame data field 6, and the data demodulating circuit 25 discriminates and demodulates the frame data from the reproduced signal 102 to generate the demodulated data 116.

As explained above, data are recorded in accordance with the sector format described in connection with FIG. 1. In the data reproducing operation, even if a data mark and a frame mark are detected from an adjacent track due to crosstalk from the adjacent track, the triggering of erroneous data reproduction is prevented by detecting the corresponding relation between the detected data mark or frame mark and the track address of the target sector.

In the data recording and reproducing operations of the present embodiment as described above, the track discriminating circuit 14 controls the selection of one of the two kinds of data marks or frame marks based on track identifying signal 106 which is output after a judgement has been made as to whether an odd number or an even number track address has been set by microprocessor 7. However, the microprocessor 7 may instead output the track identifying signal 106 directly at the same time when setting the track address.

Furthermore, in the present embodiment, the data recording is carried out by classifying all of the tracks on which data are recorded in accordance with whether the track address is of an odd number or an even number and by using respectively different data mark and frame mark patterns for those target sectors having an odd number track address and those target sectors having an even number track address. However, it is evident that the same effect can be achieved even if data recording is performed by classifying all of the tracks into more than two groups and carrying out data recording by defining and using respectively different data marks and frame marks.

Also, in the present embodiment, a data mark and a frame mark of a different signal pattern are used in the same sector. However, identical signal patterns may by used for both the data mark and frame mark of a same sector.

What is claimed is:

1. A data reproducing method for reproducing data from a disk-shaped information recording medium having formed thereon a plurality of concentric or spiral tracks each being divided into a plurality of sectors, each of the sectors having an ID field in which address information is recorded and a data field in which sector data is recorded subsequent to a data mark, the data mark being a synchronization signal at the start position of the data field for identifying a head of the data field, wherein a plurality of distinct data marks are recorded on the recording medium such that a data mark of each sector is different from a data mark of an adjacent sector of an adjacent track, said method comprising the steps of:

storing the plurality of distinct data marks;
determining a target sector from which a recorded sector data is to be reproduced;
selecting one of the stored plurality of distinct data marks according to an address of the target sector;
reproducing a data mark recorded in the data field of the target sector;
detecting whether the reproduced data mark coincides with the selected data mark; and
reproducing the recorded sector data in the data field of the target sector only when the reproduced data mark coincides with the selected data mark;
wherein the plurality of distinct data marks are stored such that a same data mark is selected for all target sectors having a same track address, and
wherein two different data marks are stored as the plurality of distinct data marks, and wherein one of the two different data marks is selected for each target sector contained in an even number track and the other of the two different data marks is selected for each target sector contained in an odd number track.

2. A data reproducing method for reproducing data from a disk-shaped information recording medium having formed thereon a plurality of concentric or spiral tracks each being divided into a plurality of sectors, each of the sectors having an ID field in which address information is recorded and a data field in which sector data is recorded subsequent to a data mark, the data mark being a synchronization signal at the start position of the data field for identifying a head of the data field, wherein a plurality of distinct data marks are recorded on the recording medium such that a data mark of each sector is different from a data mark of an adjacent sector of an adjacent track, said method comprising the steps of:

storing the plurality of distinct data marks;
determining a target sector from which a recorded sector data is to be reproduced;
selecting one of the stored plurality of distinct data marks according to an address of the target sector;
reproducing a data mark recorded in the data field of the target sector;
detecting whether the reproduced data mark coincides with the selected data mark; and
reproducing the recorded sector data in the data field of the target sector only when the reproduced data mark coincides with the selected data mark;
wherein each data field of each sector is divided into a plurality of frames in which a first frame has the data mark added at the head thereof and in which each of the remaining frames has a frame mark added at the head thereof, the frame mark for identifying the head of the frame, wherein a plurality of distinct frame marks are recorded on the recording medium such that a frame mark in each sector is different from a frame mark in the adjacent sector, and wherein said method further comprises the steps of:

storing the plurality of distinct frame marks;

selecting one of the plurality of distinct frame marks according to the address of the target sector;

reproducing a frame mark recorded in the data field of the target track;

detecting whether the reproduced frame mark coincides with the selected frame mark; and reproducing the recorded sector data in a frame of the data field of the target sector only when the reproduced frame mark coincides with the selected frame mark;

wherein the plurality of distinct frame marks are stored such that a same frame mark is selected for all target sectors having a same track address, and wherein two different frame marks are stored as the plurality of distinct frame marks, and wherein one of the two different frame marks is selected for each target sector contained in an even number track and the other of the two different frame marks is selected for each target sector contained in an odd number track.

3. A data reproducing apparatus for reproducing data from a disk-shaped information recording medium having formed thereon a plurality of concentric or spiral tracks each being divided into a plurality of sectors, each of the sectors having an ID field in which address information has been recorded and a data field in which sector data has been recorded subsequent to a data mark, the data mark being a synchronization signal for identifying a head of the data field, wherein a plurality of distinct data marks are recorded such that data marks recorded in sectors which are adjacent to each other and contained in tracks which are adjacent to each other are different from each other, said apparatus comprising:

data mark storing means for storing the plurality of distinct data marks;

means for determining a target sector from which a sector data is to be reproduced;

means for reproducing a data mark recorded in the data field of the target sector;

data mark detection means for selecting one of the plurality of distinct data marks according to an address of the target sector and for detecting a coincidence between the selected data mark and the reproduced data mark;

sector data reproducing means responsive to a detection result by the data mark detection means for reproducing the sector data from the target sector only when the reproduced data mark coincides with the selected data mark;

wherein the plurality of distinct data marks are recorded such that a same data mark is recorded in all sectors having a same track address, and wherein the data mark selection means selects one of the plurality of distinct data marks according a track address of a track containing the target sector, and wherein two different data marks are recorded as the plurality of distinct data marks, and wherein the data mark storing means stores the two different data marks, and wherein the data mark selection means selects one of the two different data marks when the target sector has an even number track address and the other of the two different data marks when the target sector has an odd number track address.

4. A data reproducing apparatus for reproducing data from a disk-shaped information recording medium having formed thereon a plurality of concentric or spiral tracks each being divided into a plurality of sectors, each of the sectors having an ID field in which address information has been recorded and a data field in which sector data has been recorded subsequent to a data mark, the data mark being a synchronization signal for identifying a head of the data field, wherein a plurality of distinct data marks are recorded such that data marks recorded in sectors which are adjacent to each other and contained in tracks which are adjacent to each other are different from each other, said apparatus comprising:

data mark storing means for storing the plurality of distinct data marks;

means for determining a target sector from which a sector data is to be reproduced;

means for reproducing a data mark recorded in the data field of the target sector;

data mark detection means for selecting one of the plurality of distinct data marks according to an address of the target sector and for detecting a coincidence between the selected data mark and the reproduced data mark;

sector data reproducing means responsive to a detection result by the data mark detection means for reproducing the sector data from the target sector only when the reproduced data mark coincides with the selected data mark;

wherein each data field of each sector is divided into a plurality of frames in which a first frame has the data mark added at the head thereof and each of the remaining frames has a frame mark added at a head thereof, the frame mark for identifying the head of the frame, wherein a plurality of distinct frame marks are recorded on the recording medium such that a frame mark in each sector is different from a frame mark in the adjacent sector, and wherein said apparatus further comprises:

frame mark storing means for storing the plurality of distinct frame marks;

frame mark reproducing means for reproducing a frame mark recorded in the data field of the target sector;

frame mark detection means for selecting one of the plurality of distinct frame marks according to the address of the target sector and for detecting a coincidence between the selected frame mark and the reproduced frame mark; and said sector data reproducing means responsive to a detection result by the frame mark detection means for reproducing the sector data from a frame of the target sector only when the reproduced frame mark coincides with the selected frame mark;

wherein the plurality of distinct frame marks are recorded such that a same frame mark is recorded in all sectors having a same track address, and wherein the frame mark selection means selects one of the plurality of distinct frame marks according to the track address of the track containing the target sector, and wherein two different frame marks are recorded as the plurality of distinct frame marks, and wherein the frame mark storing means stores the two different frame marks, and wherein the frame mark selection means selects one of the two different frame marks when the target sector has an even number track address and the other of the two different data marks when the target sector has an odd number track address.

* * * * *